United States Patent
Jacobson

(10) Patent No.: US 7,914,890 B2
(45) Date of Patent: Mar. 29, 2011

(54) CYCLIC OLEFIN-MALEIC ACID COPOLYMERS FOR STAIN RESISTS

(75) Inventor: Stephen Ernest Jacobson, Hockessin (DE)

(73) Assignee: E.I. duPont de Nemours and Company, Wilmington, DE (US)

( * ) Notice: Subject to any disclaimer, the term of this patent is extended or adjusted under 35 U.S.C. 154(b) by 594 days.

(21) Appl. No.: 12/004,118

(22) Filed: Dec. 19, 2007

(65) Prior Publication Data
US 2009/0162682 A1 Jun. 25, 2009

(51) Int. Cl.
*B32B 27/34* (2006.01)
*B32B 27/02* (2006.01)
*D06M 15/263* (2006.01)

(52) U.S. Cl. .......... 428/395; 428/394; 428/96; 428/97; 442/168; 442/93; 252/8.62; 252/8.61

(58) Field of Classification Search .............. 442/93, 442/168; 428/96, 97, 476.3, 395; 252/8.62, 252/8.61
See application file for complete search history.

(56) References Cited

U.S. PATENT DOCUMENTS

| | | | |
|---|---|---|---|
| 3,261,815 A | 7/1966 | Dowbenko | |
| 3,396,049 A | 8/1968 | Anderson et al. | |
| 3,706,594 A | 12/1972 | Wasley et al. | |
| 3,773,728 A | 11/1973 | Wasley et al. | |
| 3,844,827 A | 10/1974 | Wasley et al. | |
| 3,876,589 A | 4/1975 | Wasley et al. | |
| 3,897,206 A | 7/1975 | Kearney | |
| 3,901,998 A | 8/1975 | Wasley et al. | |
| 4,029,867 A | 6/1977 | Wasley et al. | |
| 4,038,027 A | 7/1977 | Kearney | |
| 4,748,196 A | 5/1988 | Kuroda et al. | |
| 4,833,009 A | 5/1989 | Marshall | |
| 4,883,839 A | 11/1989 | Fitzgerald et al. | |
| 4,925,707 A | 5/1990 | Vinod | |
| 4,937,123 A | 6/1990 | Chang et al. | |
| 4,940,757 A * | 7/1990 | Moss et al. ................ | 525/502 |
| 4,948,650 A | 8/1990 | Fitzgerald et al. | |
| 4,963,409 A | 10/1990 | Liss et al. | |
| 4,965,325 A | 10/1990 | Liss et al. | |
| 5,001,004 A | 3/1991 | Fitzgerald et al. | |
| 5,015,259 A * | 5/1991 | Moss et al. .................... | 8/115.6 |
| 5,032,136 A | 7/1991 | Fitzgerald et al. | |
| 5,057,121 A | 10/1991 | Fitzgerald et al. | |
| 5,059,420 A | 10/1991 | Scholla et al. | |
| 5,061,763 A * | 10/1991 | Moss et al. ................ | 525/502 |
| 5,096,747 A | 3/1992 | Scholla et al. | |
| 5,118,551 A | 6/1992 | Calcaterra et al. | |
| 5,135,774 A | 8/1992 | Calcaterra et al. | |
| 5,137,759 A | 8/1992 | Vinod | |
| 5,223,340 A * | 6/1993 | Moss et al. ................ | 428/395 |
| 5,232,743 A | 8/1993 | Calcaterra et al. | |
| 5,232,760 A | 8/1993 | Calcaterra et al. | |
| 5,236,464 A | 8/1993 | Green et al. | |
| 5,252,232 A | 10/1993 | Vinod | |
| 5,252,375 A * | 10/1993 | Turbak et al. ................ | 428/96 |
| 5,310,828 A * | 5/1994 | Williams et al. ............. | 525/502 |
| 5,346,726 A * | 9/1994 | Pechhold ................ | 427/393.4 |
| 5,348,786 A | 9/1994 | Calcaterra et al. | |
| 5,359,010 A | 10/1994 | Calcaterra et al. | |
| 5,364,541 A | 11/1994 | Calcaterra et al. | |
| 5,401,554 A | 3/1995 | Armen | |
| 5,403,359 A | 4/1995 | Krishnan et al. | |
| 5,460,887 A * | 10/1995 | Pechhold ................ | 428/395 |
| 5,464,911 A * | 11/1995 | Williams et al. ............. | 525/502 |
| 5,654,068 A * | 8/1997 | Pechhold ................ | 252/8.62 |
| 5,707,708 A * | 1/1998 | Pechhold ................ | 428/96 |
| 5,708,087 A | 1/1998 | Buck et al. | |
| 5,834,088 A * | 11/1998 | Pechhold ................ | 428/96 |
| 5,945,493 A * | 8/1999 | Pechhold et al. ............. | 526/243 |
| 6,238,792 B1 * | 5/2001 | Pechhold et al. ............. | 428/394 |
| 6,245,116 B1 * | 6/2001 | Pechhold et al. ............. | 8/115.64 |
| 6,860,905 B2 | 3/2005 | Williams et al. | |
| 7,025,794 B2 | 4/2006 | Williams et al. | |
| 7,550,199 B2 * | 6/2009 | Hopkins et al. ............. | 428/394 |
| 7,579,403 B2 * | 8/2009 | Jacobson et al. ............. | 524/571 |
| 7,579,420 B2 * | 8/2009 | Jacobson et al. ............. | 526/272 |
| 7,785,374 B2 * | 8/2010 | Jones, Jr. ................ | 8/115.6 |
| 2004/0060121 A1 * | 4/2004 | Williams et al. ............. | 8/115.51 |
| 2005/0172418 A1 * | 8/2005 | Williams et al. ............. | 8/115.51 |
| 2006/0162091 A1 * | 7/2006 | Jones, Jr. ................ | 8/115.51 |
| 2006/0242766 A1 * | 11/2006 | Jacobson et al. ............. | 8/115.51 |
| 2007/0096052 A1 * | 5/2007 | Shuey et al. ................ | 252/8.61 |
| 2009/0221200 A1 * | 9/2009 | Hopkins et al. ................ | 442/93 |
| 2009/0256104 A1 * | 10/2009 | Shuey et al. ................ | 252/8.62 |

(Continued)

FOREIGN PATENT DOCUMENTS

EP      0 033 350 B1     12/1985

(Continued)

OTHER PUBLICATIONS

Murahashi et al., The Copolymerization of Cyclic Olefins with Maleic Anhydride, Bull. Chem. Soc. Jpn 38 2082 (1965).

(Continued)

*Primary Examiner* — Cheryl Juska
(74) *Attorney, Agent, or Firm* — Kathryn M. Sanchez

(57) ABSTRACT

A polyamide substrate having deposited thereon a copolymer effective to impart resistance to staining by turmeric wherein said copolymer comprises polymer units derived from (a) at least one cyclic olefin having from 5 to 12 carbon atoms, and (b) maleic anhydride wherein the molar ratio of total cyclic olefin to maleic anhydride is between about 0.5 and 1.3, and a method for using the copolymer to impart stain resistance to a polyamide substrate.

22 Claims, No Drawings

U.S. PATENT DOCUMENTS

2009/0292092 A1* 11/2009 Jacobson et al. ............. 526/204
2010/0063231 A1* 3/2010 Jacobson et al. ............. 526/204

FOREIGN PATENT DOCUMENTS

| GB | 1152868 | 5/1969 |
| GB | 1402917 | 8/1975 |
| JP | 1981163180 A | 12/1981 |
| JP | 1993156177 A | 6/1993 |
| WO | WO 92/10605 | 6/1992 |
| WO | WO 92/12286 | 7/1992 |
| WO | WO 93/19238 | 9/1993 |
| WO | WO 2004/083513 A1 | 9/2004 |

OTHER PUBLICATIONS

Pledger et al., Copolymerization between Nonconjugated Bicyclic Dienes and Maleic Anhydride; J. Macromol. Sci.-Chem., A5(8), (1971).

W.H. Hemmpel Oct. 1980 article in Textile Praxis International, entitled, Reversible Yellowing on Brightened Textile Products, pp. 1213-1215.

W.H. Hemmpel Oct. 1981 article in Textile Praxis International, entitled, Reversible Yellowing on Textile Products—from a New Viewpoint Interesting Findings from Examination Practice, pp. 1126-1132.

Yamamoto et al., Nonconjugated Cyclic Dienes and Maleic Anhydride Co-polymers, and Derivatives, for Base Resin of Deep UV Resist; J. Photopolym. Sci. Technol., vol. 7, No. 1 (1994).

Cincu et al., Alternating Copolymers: Maleic Anhydride with Cyclic Olefins; Macromol. Reports, A13(Suppl.2), (1996).

Winter et al., Photopolymerized Acrylate Copolymer Films with Surfaces Enriched in Sulfur Pentafluoride ($-SF_5$) Chemistry; Chem. Mater. (1999), 11, 3044-3049; © American Chemical Society, USA.

* cited by examiner

CYCLIC OLEFIN-MALEIC ACID COPOLYMERS FOR STAIN RESISTS

FIELD OF THE INVENTION

This invention relates to the field of providing stain resistance to substrates using a copolymer comprising units derived from one or more cyclic olefin and maleic anhydride.

BACKGROUND OF THE INVENTION

Polyamide substrates, such as nylon carpeting, upholstery fabric and similar wool substrates and the like, are subject to staining by a variety of agents. Available treatments provide good stain resistance for acid dyes, such as the FD&C Red Dye #40, used, for instance, in beverages and foods. However, the current stain resist products do not provide good stain resistance to stains from mustard or "turmeric stain". The terms "turmeric stain" and "mustard stain" used herein mean yellow turmeric stains from any source. Yellow turmeric stains are found in various foods in addition to mustard, such as chicken soup, pickles, and spicy sauces. Different types of treatments have been proposed to deal with staining problems. One approach is to apply a highly fluorinated polymer to the substrate. Another is to use a composition containing a sulfonated phenol-formaldehyde condensation product, alone or in combination with hydrolyzed maleic anhydride polymer or polymers of methacrylic acid, acrylic acid, or itaconic acid.

For example, Liss, et al., in U.S. Pat. No. 4,963,409, disclose stain-resistant synthetic polyamide textile substrates having deposited on them sulfonated phenol-formaldehyde polymeric condensation products. However, sulfonated phenol-formaldehyde condensation products are themselves subject to discoloration, commonly turning yellow with time. Yellowing problems are described by W. H. Hemmpel in a Mar. 19, 1982 article in America's Textiles, entitled, "Reversible Yellowing Not Finisher's Fault". Hemmpel attributes yellowing to exposure of a phenol-based finish to nitrogen oxides and/or ultraviolet radiation.

☐-Olefin/maleic anhydride copolymers have been used as stain resists on polyamide nylon or wool substrates. U.S. Pat. No. 5,707,708 discloses a polyamide substrate having deposited on it an amount of a copolymer having between about 0.7 and 1.3 polymer units derived from ☐-olefin per unit derived from maleic anhydride. The ☐-olefin content of said copolymer comprises between (a) 100 and 80 mol % of a 1-alkene containing 4 to 12 carbon atoms and (b) 0 to 20 mol % of at least one 1-alkene containing 3 or 14 to 24 carbon atoms. However, copolymers of maleic anhydride with ethylene, propylene, 1,4-butadiene and 1-alkenes having 14-24 carbon atoms were considered unsatisfactory for commercial purposes as stain resists on such substrates.

Vinyl and allyl ether/maleic anhydride copolymers have also been used as stain resists on polyamide substrates as disclosed in U.S. Pat. No. 5,346,726. Optional monomers include ☐-olefins, dienes and ethylenically unsaturated aromatics (e.g., styrene).

U.S. Pat. No. 3,261,815 discloses the reaction of 1,5-cyclooctadiene and maleic anhydride to form an interpolymer containing repeating bicyclo octane groups in the polymer chain, and discloses the hydrolysis and esterification of said interpolymer. The products of the invention are stated to form hard films which can be utilized as the film-forming component of coating compositions for a metal or other hard surface.

Although copolymers of cyclic olefins, including cyclic dienes, with maleic anhydride are known, such copolymers have not previously been disclosed for use on carpets. There is a need for a stain resist agent for carpets which shows improved resistance to troublesome staining agents such as mustard stains. There is a particular need for stain resists which function well without, or with a minimum need for, sulfonated phenol-formaldehyde condensation products. The present invention surprisingly meets these needs.

SUMMARY OF THE INVENTION

The present invention provides a polyamide substrate having deposited thereon a stain resist copolymer comprising polymer units derived from (a) at least one cyclic olefin and (b) maleic anhydride. The cyclic olefin has from 5 to 12 carbon atoms. The cyclic olefin has one or more carbon-carbon double bonds. The molar ratio of total olefin to maleic anhydride is between about 0.5 and 1.3. By "total olefin" it is meant to include the total amount, on a molar basis of the olefin content of the copolymer. The olefin content of the copolymer may comprise at least one cyclic olefin, and other olefin monomers. These other olefin monomers include 1-alkenes, terminally unsaturated dienes, vinyl or allyl ethers, and ethylenically unsaturated aromatic compounds.

The present invention further provides a method to impart resistance to staining of a polyamide substrate which comprises applying to said substrate an effective amount of a copolymer comprising polymer units derived from (a) at least one cyclic olefin having from 5 to 12 carbon atoms, and (b) maleic anhydride wherein the molar ratio of total cyclic olefin to maleic anhydride is between about 0.5 and 1.3.

DETAILED DESCRIPTION OF THE INVENTION

Trademarks and trade names used herein are shown in upper case.

The present invention relates to the use of maleic anhydride/cyclic olefin copolymers as stain resists for polyamide substrates. The substrate is treated with water-soluble or water-dispersible maleic anhydride/cyclic olefin copolymers so as to impart stain resistance, especially to turmeric and coffee stains to the substrate. By "copolymer" it is meant herein to include polymers having polymer units derived from two or more monomers. At least one of the monomers is a cyclic olefin and at least one of the monomers is maleic anhydride. Other monomers are described below.

A variety of cyclic olefins or can be used for the purposes of this invention. By "cyclic olefin", it is meant herein to include cyclic hydrocarbons having one or more carbon-carbon double bonds. That is, cyclic olefins includes cyclic monoenes, cyclic dienes, and cyclic trienes. Cyclic monoenes and cyclic dienes are preferred. Particularly useful cyclic monoenes are those containing 5 to 12 carbon atoms, preferably those containing 7 to 10 carbon atoms, more preferably those containing 7 to 8 carbon atoms, such as norbornene, cycloheptene, and cis-cyclooctene, and most preferably cis-cyclooctene. Particularly useful cyclic dienes are those containing 5 to 12 carbon atoms, preferably those containing 7 to 10 carbon atoms, more preferably those containing 7 to 8 carbon atoms, such as 1,3-cyclooctadiene, 1,5-cyclooctadiene, and bicycloheptadiene, most preferably 1,3-cyclooctadiene.

In accordance with the present invention, it has been unexpectedly found that water-soluble or water-dispersible copolymers of maleic acid and one or more cyclic olefins having from 5 to 12 carbon atoms, preferably 7 to 10 carbon atoms, more preferably, 7 to 8 carbon atoms, impart excellent stain resistance to polyamide substrates for mustard and general turmeric stains (e.g., carpeting). In contrast, copolymers of maleic anhydride with cyclic olefins having 4 carbon atoms were unsatisfactory. Copolymers of maleic anhydride with cyclic olefins having 14 to 24 carbon atoms were also found to be unsatisfactory for commercial purposes as stain resists for such substrates.

The copolymer applied to the substrate may further comprise in addition to polymer units derived from the above-described cyclic olefins and maleic anhydride, polymer units derived from other, lower-cost olefin monomers. These other monomers include 1-alkenes, terminally unsaturated dienes, vinyl or allyl ethers, and ethylenically unsaturated aromatic compounds. For example, suitable other monomers include 1-alkenes having 4 to 12 carbon atoms, terminally unsaturated dienes having 4 to 18 carbon atoms, vinyl or allyl ethers. Preferably the 1-alkene has 4 to 10 carbon atoms, more preferably the 1-alkene, is selected from the group consisting of isobutylene, 1-butene, 1-hexene, 1-octene, 1-decene, and dodecane, with isobutylene and 1-octene being preferred and 1-octene being most preferred. Preferred terminally unsaturated dienes include butadiene, chloroprene, isoprene, 2-methyl-1,5-hexadiene. Particular examples of allyl or vinyl ether include, n-butyl vinyl ether, isobutyl vinyl ether, iso-octyl vinyl ether, 2-perfluorohexylethyl vinyl ether, ally n-butyl ether, allyl phenyl ether, allyl glycidyl ether. Preferred ethylenically unsaturated aromatic compound is styrene or styrene derivatives. Styrene derivatives include a-methyl styrene, 4-methyl styrene, 4-acetoxystyrene, stilbene, 4-acetoxystilbene.

Copolymers used in this invention may further comprise polymer units derived from a chain transfer agent. A chain transfer agent may be added for the purpose of limiting the molecular weight of the polymer. Examples of suitable chain transfer agents include acetic acid, acetone, n-butyl alcohol, chloroform, di-n-butyl disulfide, carbon tetrachloride, carbon tetrabromide, triethylamine, n-butyl mercaptan, and dodecylmercaptan. Preferably, when a chain transfer agent is used, the chain transfer agent is dodecylmercaptan.

Copolymers suitable for use as stain resists in this invention comprise between about 0.5 and 1.3 polymer units derived from olefin monomers per polymer unit derived from maleic anhydride, wherein olefin monomers such as cyclic olefins, and other olefin monomers, wherein further, other olefin monomers include 1-alkenes, terminally unsaturated dienes, vinyl or allyl ethers, and ethylenically unsaturated aromatic compounds. Preferably the range is about 0.9 to 1.1 polymer units derived from olefin monomers per polymer unit derived from maleic anhydride. Still more preferably this ratio is about 1.

The olefin content of the copolymer applied to the substrate or used in the method of this invention is between (a) 100 and 10 mol % of one or more cyclic olefins; (b) 0 to 90 mol % of a 1-alkene having 4 to 12 carbon atoms and/or terminally unsaturated diene having 4 to 18 carbon atoms; (c) 0 to 90% of an allyl or vinyl ether; (d) 0 to 90% of an ethylenically unsaturated aromatic compound. Copolymers having the highest proportion of component (a) show the greatest benefits in improved stain resistance. However, improvements in stain resistance are often accompanied by increases in cost of the monomer components of the polymer.

At least 95 wt % of the copolymers in this invention have a number average molecular weight in the range of between about 700 and 200,000, preferably between about 1,000 and 100,000.

The maleic anhydride copolymers useful in the current invention can be prepared by methods well-known in the art. See, for example, Murahahi, et al., "The Copolymerization of Cyclic Olefins with Maleic Anhydride", *Bull. Chem. Soc. Jpn.* 38, 2082 (1965).

The maleic anhydride polymers thus obtained can be hydrolyzed to the free acid or their salts by reaction with water or alkali. Generally, the hydrolyzed maleic anhydride polymer, or the monoester polymer, should be sufficiently water-soluble so that uniform application to a polyamide surface can be achieved at an appropriate acidity. Applications using water dispersions of the polymer mixed with a suitable surfactant may also be used to impart stain resistance.

Optionally, the stain-resists of the current invention may be blended with other known stain-resists, such as phenol-formaldehyde condensation products as disclosed in U.S. Pat. Nos. 4,833,009 and 4,965,325; methacrylic acid polymers disclosed in U.S. Pat. No. 4,937,123; or hydrolyzed polymers of maleic anhydride and one or more ethylenically unsaturated aromatic compounds described by Fitzgerald et al., in U.S. Pat. No. 5,001,004.

The cyclic olefin/maleic anhydride copolymer of this invention can be used as stain resists in treating polyamide substrates. They can be effectively applied to polyamide substrates by a wide variety of methods known to those skilled in the art, such as: padding, spraying, foaming in conjunction with foaming agents, batch exhaust in beck dyeing equipment, or continuous exhaust during a continuous dyeing operation. They can be applied by such methods to dyed or undyed polyamide substrates. In addition, they can be applied to such substrates in the absence or presence of a polyfluoroorganic oil-, water-, and/or soil-repellent materials. In the alternative, such a polyfluoroorganic material can be applied to the substrate before or after application of the polymers of this invention thereto.

The polyamide substrate is preferably a fibrous substrate. More preferably the substrate is a polyamide carpet.

The quantities of the copolymers which are applied to the polyamide substrate are amounts effective in imparting stain-resistance to the substrate. Those amounts can be varied widely; in general, one can use between 1 and 5% by weight of the copolymer based on the weight of the substrate, usually 2.5% by weight or less. Higher amounts can be used, at higher cost. The polymers can be applied, as is common in the art, at a pH between about 2 and 7. However, more effective exhaust deposition in the method of this invention can be obtained at a pH as low as 1.5. When pH 1.5 is used, the preferred level of application to the substrate is about 2.5% by weight, based on the weight of the substrate. In one embodiment, a pH between about 2 and 3 is used.

Particularly effective stainblocking is obtained if the copolymer is applied to a polyamide substrate at either (a) ambient temperature, e.g., about 20° C., followed by heat treatment at a temperature in the range between about 50° C. and 150° C. for about 1 to 60 minutes, or (b) applied at temperatures in the range between about 40° C. and 95° C. for about 1 to 60 minutes. For example, at a pH between about 2 and 3, a temperature between about 70° C. and 90° C. is preferred. While these conditions may be preferred, stainblocking can be obtained when application is effected even at the temperature of cold tap water (10° C.-15° C.).

The substrates of this invention can also be prepared by applying said cyclic olefin/maleic anhydride copolymer in-place to polyamide carpeting which has already been installed in a residence, office or other locale. Said copolymer can be applied as a simple aqueous preparation or in the form of aqueous shampoo preparation, with or without one or more polyfluoroorganic oil-, water-, and/or soil-repellent materials. Said copolymer may be applied at the levels described above, at temperatures described, and at a pH between about 1 and 12, preferably between about 2 and 9.

Materials

All chemicals were purchased from Sigma-Aldrich, Milwaukee, Wis., except where stated.

Test Methods

The test methods used to measure the performance of samples as a stain-resist agent are summarized in the following sections;

Carpet Substrates

The carpet material was a residential cut pile two ply 1150, 3.5 turns per square inch, 5/32 gauge, pile height 0.5 in., 30 oz per square yard, dyed light blue and available from Invista, Wilmington, Del.

Coffee Stain Test

Carpet samples, 6.76×6.76-inch (17.2×17.2 cm) squares of dyed carpet, were cut and placed pile side up on a non-absorbent surface. The pile was cleaned of any unattached materials by vacuuming. ORIGINAL MAXWELL HOUSE ground coffee (33.8 g), available from Maxwell House Coffee Co., Tarrytown N.Y. was placed into a standard 10-cup coffee filter. Deionized water (1266.2 g) was added and the coffee brewed according to the manufacturers' directions. The pH of the coffee was adjusted to 5.0 using aqueous solutions containing either 30% aqueous sodium hydrogen sulfate or 10% sodium hydroxide as needed. The coffee was poured into a suitable volumetric dispenser, capable of dispensing 50 mL portions and the dispenser placed in the hot water bath at 62° C. The coffee was allowed to come to a temperature 140° F.±5° F. (60°±2.8° C.) and remain at that temperature for 30±5 minutes prior to staining. A ring, in the shape of an open-ended cylinder was used, having a diameter of the smaller opening of 2.75 inch (7 cm). Such a ring is described for a different purpose in AATCC Test Method 175. The ring was placed at the center of the carpet sample, with the smaller diameter opening against the pile. The coffee dispenser was set to measure 50 mL, and purged once prior to staining. With the ring pressed down into the pile, 50 mL of coffee was transferred into a container and immediately poured into the ring and onto the carpet. The coffee was worked into the carpet evenly and thoroughly with the base of the cup. The coffee was allowed to stain the carpet for 4 hours±20 minutes. Then the carpet samples were thoroughly rinsed in cold water for at least 10 minutes until the rinse water was clear. The carpet samples were extracted using vacuum and air-dried for 24 hours on a non-absorbent surface. The coffee stains obtained by this procedure were rated using a delta E color difference measurement.

For color measurement with delta E color difference, the color of each control and test carpet was measured both before and after the coffee stain test. The initial color of the carpet (L*, a*, b*) was measured on an unstained piece of carpet. The delta E is the difference between the color of the unstained and stained samples, expressed as a positive number. The color difference was measured using a Minolta Chroma Meter CR-410. Color readings were taken on several areas on the carpet sample, and the average delta E was reported. Control carpets were of the same color and construction as the carpets for test items. A delta E reading of zero represents no color difference between two samples. A larger delta E value indicates a color difference between two samples. Color measurement with delta E is discussed in AATCC Evaluation Procedure 7 "Instrumental Assessment of the Change in Color of a Test Specimen".

The calorimetric delta E values from the coffee stain resist test on a sample and control were used to calculate the "Percent Coffee Blocked". Higher values denote better stain blocking. The percent blocking of the stain is calculated as:

$$100(\text{Delta } E_{untreated} - \text{Delta } E_{treated})/\text{Delta } E_{untreated}.$$

Test Method—Mustard Stain Test

A 2" brass ring was placed in the center of a 4-6" square sample of carpet which is on a non-absorbent surface. For the mustard stain test, fifteen grams of French's yellow mustard were used to create a stain by placing the mustard in the middle of the brass ring on the carpet, and then spreading and pressing the stain into the carpet surface. After setting for 24 hours, the excess mustard was (a) scraped off, (b) thoroughly rinsed with water, (c) extracted, and (d) air-dried for 24 hours on a non-absorbent surface.

Mustard stains were rated with a visual stain rating scale (AATCC Red 40 Stain Scale) from AATCC Test Method 175. A visual rating of 10 (complete stain removal) to 1 (maximum or unchanged stain) was used that approximated the AATCC Red 40 Stain Scale (Test Method #175) with the mustard stains having the same discoloration as the numbered colored film, though discoloration of the mustard stain was yellow while the discoloration of AATCC Red 40 Stain Scale was red. Thus, higher values represent superior stain resistance.

Test Method-UV Colorfastness

The colorfastness to UV light was measured according to AATCC Test Method 16-1998. This test measures the resistance of a material to change in its color characteristics as a result of the exposure of the material to sunlight or an artificial light source. The specimens were rated after exposure to 40 MTCC Fading Units (AFU) according to the Gray Scale (ISO International Standard 105/1 Part 2) for color change. Higher values represent superior stain resistance.

Test Method—NOx Colorfastness

The determination of colorfastness to oxides of nitrogen was carried out according to AATCC Test Method 164-2001. This test method is used to determine the resistance of the color change of textiles to the action of oxides of nitrogen in the atmosphere at elevated temperatures with relative humidity above 85%. At the end of 2 cycles the specimens were rated according to the Gray Scale (ISO International Standard R105/1 Part 2) for color change. Higher values represent superior stain resistance.

Application Method for Testing

Dyed and unbacked 1150 denier two ply, heatset residential carpet (light blue) was cut into approximately 4 inch×4 inch squares (approximately 10 cm×10 cm) and each square weighed as dry carpet samples. The weight was typically about 13 grams per sample. Each carpet sample was saturated with water and then most of the water in the carpet was removed by mechanical means (such as by spin-drying extraction) until the weight of water remaining in the carpeting was about 40% of the dry carpet weight.

Each stainblocker application solution contained 65 grams of deionized water, DOWFAX 2A4 surfactant (0.05 grams) available from Dow Chemical Company, Midland, Mich., and 0.26 grams of polymer from one of the Examples hereafter; i.e. 4 grams per liter concentration of stainblocker polymer solids in the application solution. The solution was adjusted to pH 2 with sodium bisulfate. The stainblocker application solution was applied to the carpet at 500% wet pick up. (The weight of carpet sample (grams)×500%=grams of stainblocker solution applied.) The stainblocker application solution was applied evenly to the wetted carpet samples in an amount equal to 500% of the dry carpet sample (500% wet pickup), and manually worked into the substrate until the substrate was fully saturated.

The stainblocker polymer was applied to the carpet sample at a rate of 2 weight percent polymer solids per weight of carpet, (i.e. 4/1000×500%=2%). A single layer of one or more of the treated carpet samples was placed on the bottom of a microwave-safe plastic tray (any microwave-safe plastic tray of adequate size may be used) with the pile side up. A few holes were punctured in the lid to prevent steam buildup, and the lid was placed on the plastic tray. Using a household microwave oven with a temperature probe (such as a General Electric model JVM1660, from General Electric, Schenectady N.Y.), the carpet was heated in the plastic tray at full power level until the temperature reached between 195+/−2° F. (91+/−1° C.) and the temperature held at that temperature for 2 minutes. The microwave oven temperature probe and internal temperature monitoring were used to control the temperature. The samples were then rinsed thoroughly with water. Most of the water in the carpet sample was removed by spin-drying with an extractor until the weight of water remaining in the carpeting was about 40% of the dry carpet weight. The carpet sample was then completely dried in an oven at between 160° F. and 180° F. (70° C. and 80° C.); typically for about 25 to 35 minutes. The carpet samples were allowed to cool completely, for at least 10-15 minutes, and to reach equilibrium with the room environment before proceeding with stain testing.

The following Examples are given to illustrate the invention not limit it. Unless otherwise indicated, all parts and percentages are by weight. Stain resistance for the Examples was measured by the techniques described above.

Molecular Weight

The following abbreviations are used in this section:
$M_n$—number average molecular weight
$M_w$—weight average molecular weight
$M_w/M_n$—polydispersity Determinations of molecular weights ($M_n$, and $M_w$) were accomplished using size exclusion chromatography coupled with multi-angle light scattering and differential viscometry (SEC/MALS/Viscometry).

EXAMPLES

Example 1 (108956-26)

cis-Cyclooctene (22.0 g, 0.20 mole), maleic anhydride (29.4 g, 0.30 mole), methyl isobutyl ketone (75 g), and dodecylmercaptan (0.6 g) were added to a round-bottom flask equipped with a condenser, nitrogen purge, and overhead stirrer. The solution was stirred and heated to 95° C. Nitrogen was purged subsurface for one hour. t-Amylperoctoate (4.2 ml) was added with a syringe pump at a steady rate for a one hour period. The reaction mixture was heated at 95° C. for 20 hours. The reaction was monitored by the disappearance of the monomers via gas chromatography. Part of the methyl isobutylketone (50 g) was removed by distillation and the solution was added to a 50:50 hexane:toluene solution to precipitate the polymer. The precipitate was filtered, washed with toluene and then hexane. The precipitate was dried in a 60° C. vacuum oven to provide 34.4 g of polymer. The polymer was characterized by molecular weight and $^1$H NMR and FTIR spectroscopies. In addition, $M_w$=3200 and $M_w/M_n$=1.3 for this polymer.

Example 2

Cycloheptene (28.2 g, 0.30 mole) was polymerized with maleic anhydride (29.4 g, 0.30 mole) in the same way with the same quantities of other reagents as Example 1, except that the temperature was 90° C. The dry polymer was isolated, 19.4 g, and characterized as in Example 1. In addition, $M_w$=1300 and $M_w/M_n$=1.2 for this polymer.

Example 3

Example 2 was repeated except that n norbornene (28.2 g, 0.30 mole) was used instead of cycloheptene. The polymer was isolated, 54.5 g, and characterized by $^1$H NMR and FTIR spectroscopies.

Example 4 cis-cis-1,3-Cyclooctadiene (21.6 g, 0.20 mole), maleic anhydride (19.6 g, 0.20 mole), methyl isobutylketone (200 g), and dodecylmercaptan (1.2 g) were weighed into a 500-ml round bottomed flask equipped with a condenser, nitrogen inlet, and overhead stirrer. The solution was stirred and heated to 75° C. The solution was purged with nitrogen subsurface for one hour. Benzoyl peroxide (7.3 g, 0.03 mole) was added with a dropping funnel over a 20 minute period. The solution was stirred at 75° C. for 20 hours. About one-half of the solvent was removed and the polymer precipitated with toluene. The polymer, 39.7 g, was isolated and characterized as in Example 1. In addition, $M_w$=2400, $M_w/M_n$=1.1 for this polymer.

Example 5

Example 1 was repeated except no dodecylmercaptan was used. The polymer, 34.8 g, was isolated and characterized as in Example 1. In addition, $M_w$=3900, $M_w/M_n$=1.2 for this polymer.

Example 6 cis,cis-1,3-Cyclooctadiene (10.8 g, 0.10 mole), 1-octene (23.0 g, 0.20 mole), maleic anhydride (39.2 g, 0.40 mole), and methyl isobutylketone (200 g) were added to a round bottomed flask equipped as in Example 1. The solution was stirred and heated to 75° C. Nitrogen was purged subsurface for one hour. Benzoyl peroxide (7.3 g, 0.03 mole) was added over a 20 minute period. The solution was reacted for 20 hours at 75° C. The polymer was isolated by adding the polymer solution to a large excess of hexane. The polymer, 48.5 g, was isolated and characterized characterized by $^1$H NMR and FTIR spectroscopies.

Example 7

Example 1 was repeated except cyclododecene (a mixture of cis and trans isomers) (33.2 g, 0.20 mole) was used instead of cyclooctene. The polymer, 35.6 g, was isolated and characterized by $^1$H NMR and FTIR spectroscopies.

Example 8 cis-Cyclooctene (33.0 g, 0.30 mole), 4-acetoxystyrene (16.4 g, 0.10 mole), maleic anhydride (38.8 g, 0.40 mole), dodecylmercaptan (1.2 g), and methylisobutyl ketone were added to a 500-ml round bottom flask equipped in the same way as in Example 1. The solution was heated to 95° C., purged with nitrogen for one hour, and t-amyl-peroctoate (8.4 ml) was added over a one hour period. The solution was allowed to react for 20 hours. The polymer was precipitated with a 50:50 hexane:toluene mixture to yield 75.7 g of dry polymer which was characterized by $^1$H NMR and FTIR spectroscopies.

Example 9 cis,cis-Cyclooctadiene (10.8 g, 0.10 mole), maleic anhydride (39.2 g, 0.40 mole), 1-octene (23.0 g, 0.20 mole), dodecylmercaptan (0.8 g), and methyl isobutylketone (100 g) were added to the same reactor as in Example 1. The solution was heated to 95° C., purged with nitrogen for one hour, and t-amylperoctoate (5.25 g) was added over a one hour period. The solution was allowed to react at 95° C. for 20 hours. The polymer was precipitated from a 50:50 hexane:toluene solution. The polymer was dried in vacuo at 60° C. and 42.3 g was isolated and characterized by $^1$H NMR and FTIR spectroscopies.

Example 10

This Example uses half the amount of dodecylmercaptan as in Example 4 to see effect of molecular weight. cis,cis-1,3-Cycloctadiene (21.6 g, 0.20 mole), maleic anhydride (19.6 g, 0.20 mole), dodecylmercaptan (0.6 g), and methyl isobutyl ketone (200 g) were added to the same apparatus as in Example 1. The solution was heated to 75° C., purged subsurface with nitrogen. Benzoyl peroxide (7.3 g, 0.03 mole) was added over a 20 minute time period. The solution was allowed to react for 20 hours. A sample was removed for molecular weight determination before hydrolysis. The solvent was removed and it was dried in the oven at 70° C. The polymer had $M_w$=3200, $M_w/M_n$=1.2.

The solution was cooled and 10% sodium hydroxide (100 g) and 150 g water were added to solution. The methylisobutyl ketone-water azeotrope was removed at 400 mm Hg and 80° C. The final aqueous solution of hydrolyzed polymer (216 g solution, 25% solids, pH=7.3) was used in stain resist testing.

Example 11

Allyl phenyl ether (7.3 g, 0.055 mole), 1,3-cyclooctadiene (6.0 g, 0.055 mole), maleic anhydride (10.8 g, 0.11 mole), and methyl isobutylketone (80 g) were added to the same apparatus as in Example 1. The solution was heated to 85° C. and purged subsurface with nitrogen for one hour. t-Amylperoctoate (2.5 ml) was added to the solution over a one-hour period. The solution was allowed to react at 85° C. for three hours. The solution was cooled, one-half of the solvent removed, and the solution poured into an excess of methanol (500 ml) to precipitate the polymer. The polymer was filtered, washed with methanol, and dried under vacuum at 80° C. The polymer, 19.8 g, was isolated and characterized by $^1$H NMR and FTIR spectroscopies.

Example 12 cis-Cyclooctene (11.0 g, 0.10 mole), 1,3-cyclooctadiene (10.4 g, 0.10 mole), maleic anhydride (29.4 g, 0.30 mole), and methyl isobutylketone (75 g) were added to the same apparatus as in Example 1. The solution was heated to 95° C. and purged subsurface with nitrogen for one hour. Then, t-amylperoctoate (10.0 ml) was added over a one-hour period. The reaction was stopped after two hours and cooled to room temperature. The reaction mixture was poured into an excess (one liter) of 50:50 toluene:hexane, filtered, and dried at 60° C. under vacuum. The polymer, 62.8 g, was isolated and characterized by $^1$H NMR and FTIR spectroscopies. In addition, $M_w$=4500, $M_w/M_n$=1.2 for this polymer.

Comparative Example A

To a 250-ml round bottomed flask equipped as in Example 1 was charged maleic anhydride, (7.7 g, 0.078 mole), allyl phenyl ether (10.5 g, 0.078 mole, and methyl isobutyl ketone (50 g). The solution was heated to 70° C. and purged subsurface with nitrogen for one hour. Benzoyl peroxide (1.2 g) was then added and the solution was agitated at 70° C. for 6 hours. The solution was cooled and the volatiles were reduced by one half and the resulting solution was added to an excess of methanol to precipitate a white solid which was washed with ether and dried at 60° C. in a vacuum oven. The solid was characterized by $^1$H NMR and FTIR spectroscopies.

Stain Test Results

The copolymers of the Examples were tested on the 6,6 nylon carpet described above in "Stain Test Methods". Each set of compositions was tested separately against a 1-octene/maleic anhydride (MA) stain resist composition prepared according to U.S. Pat. No. 5,707,708, Example 5, herein referred to as Control A. In addition, the results for stain resistance of untreated carpet are provided as Control B. The copolymers of the Examples, Comparative Example A and of Control A were hydrolyzed with an aqueous solution of sodium hydroxide at a 1:1 maleic anhydride:sodium hydroxide molar ratio at 70-80° C. for 3-6 hours to give a 30 wt % aqueous solution. This solution was applied to 6,6 nylon carpet sample at 2 wt % polymer solids per weight of carpet. As conditions may vary, Controls were run for each series. Abbreviations used in the Tables are as follows: MA is maleic anhydride; 1,3-cod is 1,3-cyclooctadiene; ddm is dodecylmercaptan.

TABLE 1

| Example | Stain Resist Copolymer | % Coffee Blocked | 24-hour Mustard Test Results |
|---|---|---|---|
| 1 | cyclooctene-MA/ddm | 29 | 5 |
| 2 | cycloheptene-MA/ddm | 32 | 3 |
| 3 | norbornene-MA/ddm | 30 | 3 |
| 4 | 1,3-cod-MA/ddm | 35 | 7 |
| 5 | cyclooctene-MA | 39 | 5 |
| 6 | 1,3-cod-1-octene-MA | 26 | 5 |
| 7 | cyclododecene-MA/ddm | 30 | 5 |
| 8 | cyclooctene-4-acetoxystyrene-MA/ddm | 45 | 4 |
| 9 | 1,3-cod-1-octene-MA/ddm | 25 | 5 |
| 10 | 1,3-cod-MA/ddm | 26 | 5 |
| Control A | 1-octene-MA | 20 | 2 |
| Control B | None | 0 | 0 |

As shown in Table 1, the carpets treated with the stain resists of the invention comprising cyclic olefin polymer units have much better resistance to coffee and mustard stains than carpet treated with stain resist of the prior art (Control A) and far superior stain resistance than untreated carpet (Control B).

TABLE 2

| Example | Stain Resist Copolymer | % Coffee blocked | 24-hour Mustard Test Results | UV 40 hrs | NOx 2 cycles |
|---|---|---|---|---|---|
| 10 | 1,3-cod-MA/ddm | 26 | 5 | 3 | 2.5 |
| Control A | 1-octene-MA | 22 | 2 | 3 | 2 |

As shown in Table 2, the carpet treated with the stain resist of the invention comprising cyclic olefin polymer units has much better resistance to coffee and mustard stains than the stain resist of the prior art (Control A). In addition, UV light and NOx colorfastness of the treated carpet are the same or improved with the stain resist of this invention relative to carpet treated with the prior art stain resist.

TABLE 3

| Example | Stain Resist Copolymer | % Coffee Blocked | 24 hr mustard |
|---|---|---|---|
| 11 | Allyl phenyl ether-1,3-cod-MA | 27 | 6 |
| Comp. A | Allyl phenyl ether-MA | 21 | 3 |
| Control B | untreated | 0 | 0 |

As shown in Table 3, the carpet treated with the stain resist of the invention comprising cyclic olefin polymer units has much better resistance to coffee and mustard stains than the stain resist of the prior art (Comparative Example A) and far superior to untreated carpet (Control B).

TABLE 4

| Example | Polymer | % coffee Blocked | 24 hour mustard |
|---|---|---|---|
| 12 | 1,3-cod-1-octene-MA | 26 | 6 |
| Control A | 1-octene-MA | 23 | 2 |
| Control B | Untreated | 0 | 0 |

As shown in Table 4, the carpet treated with the stain resist of the invention comprising cyclic olefin polymer units has better resistance to both coffee and mustard stains than the stain resist of the prior art (Control 2,1-octene-MA polymer) and is far superior to untreated carpet.

These performance tests demonstrate the superiority of the cyclic-MA polymers when used as stain resists to mustard and coffee stains in comparison to a 1-octene-MA polymer and allyl phenyl ether-MA polymer, in addition to substantial improvement in stain resistance for treated carpet over an untreated Control. Control A and Comparative Example A are representative of classes of stain resist polymers previously disclosed (U.S. Pat. Nos. 5,707,708, 5,346,726, and 5,834,088).

What is claimed is:

1. A polyamide substrate having deposited thereon a copolymer comprising polymer units derived from (a) at least one cyclic olefin having from 7 to 10 carbon atoms and (b) maleic anhydride, wherein the molar ratio of total cyclic olefin to maleic anhydride is between 0.5 and 1.3, said copolymer reducing turmeric stains.

2. The substrate of claim 1 wherein said polymer is a hydrolyzed polymer.

3. The substrate of claim 1 wherein at least one of said cyclic olefin is a cyclic monoene.

4. The substrate of claim 1 wherein at least one of said cyclic olefin is a cyclic diene.

5. The substrate of claim 3 wherein the cyclic olefin is selected from the group consisting of norbornene, cycloheptene, and cis-cyclooctene.

6. The substrate of claim 4 wherein the cyclic olefin is selected from the group consisting of 1,3-cyclooctadiene, 1,5-cyclooctadiene, and bicycloheptadiene.

7. The substrate of claim 1 wherein the copolymer further comprises polymer units derived from a 1-alkene having 4 to 12 carbon atoms, a terminally unsaturated diene having 4 to 18 carbon atoms, a vinyl or allyl ether, or an ethylenically unsaturated aromatic compound.

8. The substrate of claim 7 wherein the copolymer further comprises polymer units derived from a 1-alkene.

9. The substrate of claim 1 wherein the copolymer further comprises polymer units derived from a chain transfer agent.

10. The substrate of claim 9 wherein the chain transfer agent is dodecylmercaptan and wherein the copolymer further comprises polymer units derived from a 1-alkene, wherein the 1-alkene is 1-octene.

11. The substrate of claim 1 wherein the olefin content of said copolymer is between (a) 100 and 10 mol % of one or more cyclic olefins and (b) 0 to 90 mol % of a 1-alkene containing 4 to 12 carbon atoms and/or terminally unsaturated diene containing 5 to 18 carbon atoms.

12. The substrate of claim 1 wherein the substrate is a polyamide carpet.

13. A method for imparting resistance to staining of a polyamide textile substrate by turmeric which comprises applying to said substrate an effective amount of a copolymer comprising polymer units derived from (a) at least one cyclic olefin having from 7 to 10 carbon atoms, and (b) maleic anhydride wherein the molar ratio of total cyclic olefin to maleic anhydride is between about 0.5 and 1.3.

14. The method of claim 13 wherein said polymer is hydrolyzed prior to applying to said substrate.

15. The method of claim 14 wherein at least one of said cyclic olefin is a cyclic monoene.

16. The method of claim 14 wherein at least one of said cyclic olefin is a cyclic diene.

17. The method of claim 15 wherein the cyclic olefin is selected from the group consisting of norbornene, cycloheptene, and cis-cyclooctene.

18. The method of claim 16 wherein the cyclic olefin is selected from the group consisting of 1,3-cyclooctadiene, 1,5-cyclooctadiene, and bicycloheptadiene.

19. The method of claim 13 wherein the copolymer further comprises polymer units derived from a 1-alkene having 4 to 12 carbon atoms, a terminally unsaturated diene having 4 to 18 carbon atoms, a vinyl or allyl ether, or an ethylenically unsaturated aromatic compound.

20. The method of claim 14 wherein the hydrolyzed copolymer is applied at (a) ambient temperature, followed by heat treatment at a temperature in the range between about 50° C. and 150° C. for about 1 to 60 minutes, or (b) a temperature in the range of between about 40° C. and 95° C. for about 1 to 60 minutes.

21. The method of claim 14 wherein the hydrolyzed copolymer is applied in an amount of between 1 and 5% by weight of the copolymer based on the weight of the substrate, and at a pH between about 2 and 7.

22. The method of claim 14 wherein the copolymer is applied in-place to installed polyamide carpeting.

* * * * *